Feb. 10, 1925.

L. LE PAGE

CHART

Filed Oct. 21, 1924

1,525,754

| | HEIGHT | | | |
|---|---|---|---|---|
| WIDTH | 3'— 6" | 4'— 6" | 5'— 6" | 6'— 6" |
| 2'-4" | 5.70 | 6.40 | 7.10 | 7.80 |
|  | 5.88 | 6.60 | 7.32 | 8.04 |
|  | 5.98 | 6.73 | 7.48 | 8.23 |
|  | 6.40 | 7.23 | 8.03 | 8.85 |
|  | 6.73 | 7.73 | 8.73 | 9.73 |
|  | 7.73 | 8.98 | 10.23 | 11.48 |
| 2'-10" | 6.10 | 6.80 | 7.50 | 8.20 |
|  | 6.30 | 7.02 | 7.74 | 8.46 |
|  | 6.40 | 7.15 | 7.90 | 8.65 |
|  | 6.85 | 7.68 | 8.48 | 9.30 |
|  | 7.10 | 8.10 | 9.10 | 10.10 |
|  | 8.10 | 9.35 | 10.60 | 11.85 |
| 3'-4" | | | | |
| 3'-10" | | | | |
| 4'-4" | | | | |

BLACK → REAR WINDOW FRAMES    FRONT CASEMENT FRAMES ← BROWN
RED → REAR CASEMENT FRAMES    CONCRETE WINDOW FRAMES ← YELLOW
PURPLE → FRONT WINDOW FRAMES    BRICK WINDOW FRAMES ← GREEN

Row labels (left): BLACK, RED, PURPLE, BROWN, YELLOW, GREEN
Row labels (right): BLACK, RED, PURPLE, BROWN, YELLOW, GREEN INVENTOR
Louis Le Page
BY Harry T. Totten
ATTORNEY Patented Feb. 10, 1925.

1,525,754

UNITED STATES PATENT OFFICE.

LOUIS LE PAGE, OF SAN FRANCISCO, CALIFORNIA.

CHART.

Application filed October 21, 1924. Serial No. 744,930.

*To all whom it may concern:*

Be it known that I, LOUIS LE PAGE, a citizen of the United States, residing at city and county of San Francisco and State of California, have invented certain new and useful Improvements in Charts, of which the following is a specification.

My invention relates to a chart for ready reference. Its general object is to provide a chart essentially characterized by means for quickly and accurately imparting desired related information concerning a plurality of products, without confusion or waste of time. Its special object is to thus secure predetermined price quotations of manufactured products, and in this connection, for the sake of example, I shall herein describe and illustrate the chart, though it is to be understood that variations may be made to adapt it for reference in connection with other objects and related or cognate information.

It may be of advantage to state at the outset that the essential characteristic of my chart lies in the visual correspondence between the imprint designation on the chart of the product and that of the price quotation, and that in the practical development of this characteristic the products and the price quotations will be pluralized, each related pair having a different visual impression, and all arranged in such tabular form as will provide for a variety of other information such for example, as different sizes, and different sub titles of main classes, and other grouping, but that without regard to the extent of pluralization, the fullness of the chart, the visual correspondence will be sufficient to immediately identify the related pairs whether the companion be made from the product to the price or in reverse order.

Referring to the accompanying drawing, the figure is a face view of my chart showing it as prepared for one class and species of products, their dimensions and prices, this view being deemed sufficient, without further multiplication, to fully disclose my invention.

The body of the chart, indicated by the parallelogram 1—1—1—1, is a sheet of cardboard, or other convenient material. Upon the head of the sheet are printed the products with which the chart deals, in this case, said products being all "Frames," severally qualified as "Rear window," "Rear casement," "Frost window," "Frost casement," "Concrete window" and "Brick window." Below these headings, the body of the chart is ruled vertically and horizontally to form the several spaces for further designating imprints, the vertically aligned spaces being, as shown, referable to "Height" and the horizontal spaces referable to "Width", each of these columns bearing its appropriate figures.

Within each space and severally referable to both height and width are the figures indicative of price.

Each product heading is printed in such wise as to present a different visual impression from that presented by each of the other product headings. This presentation may be made by difference in form or outline or other difference, but in the best and preferred practise, it is presented by a difference in color. It being impracticable in this case, to indicate color by conventional shading, I have shown this varying color feature by designating words and arrows. Thus, in the present instance, the rear window frames are in black, the rear casement frames in red, the front window frames in purple, the front casement frames in brown, the concrete window frames in yellow, and the brick window frames in green. The price imprints of all dimensions severally referable to each of the products, are in the same color as the product to which they refer, and this feature I have also indicated by words and arrows. Thus, it will be seen that the prices of all sizes of rear window frames are in black, those of rear casement frames are in red, those of front window frames are in purple, and so forth throughout.

In the use of the chart, the observer has, therefore, merely to compare the colors, in order to find the price of any given product in any given size. For example, if he should desire to find the price of concrete window frame 2'—4" wide and 6'—6" high, he will look in the appropriate dimensional space, the last column, top space, for the yellow price figures, and will find that the price is $9.73, or if he should wish to find the price of a rear window frame 2'—10" wide and 4'—6" high he will look in the second column, second space, for the black figures and thus find the price is $6.80. These examples will suffice.

In practise, the eye will quickly find the color correspondence without confusion and regardless of the voluminous array of figures.

I claim:

1. A reference chart comprising a sheet bearing a plurality of imprints of products each conveying a different visual impression, and also bearing a plurality of imprints of prices, severally referable to said products, said price imprints each conveying a visual impression corresponding to that of the product to which it refers.

2. A reference chart comprising a sheet bearing a plurality of imprints of products, each in a different color, and also bearing a plurality of imprints of prices, severally referable to said products, said price imprints being each in a color corresponding to the color of the product to which it refers.

3. A reference chart comprising a sheet bearing a plurality of imprints of products, each in a different color, said sheet being ruled into a plurality of columnar spaces with dimensional designations severally referable to said spaces, and said sheet also bearing in said spaces a plurality of imprints of prices, each being in a color corresponding to the color of the product to which it refers.

In testimony whereof I have signed my name to this specification.

LOUIS LE PAGE.